Dec. 23, 1952  H. G. SHAW ET AL  2,622,347
SHOE AND ITS MANUFACTURE
Filed Sept. 7, 1950  4 Sheets-Sheet 1
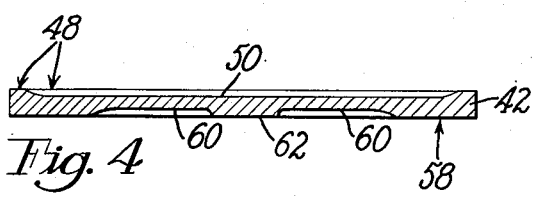
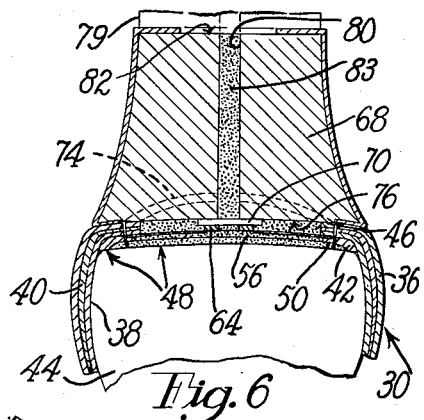
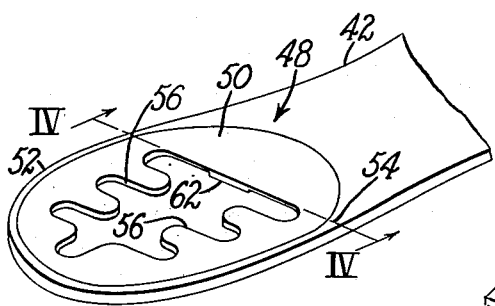
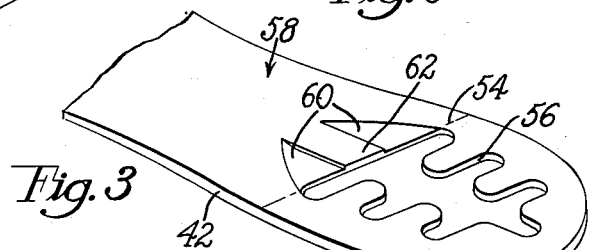
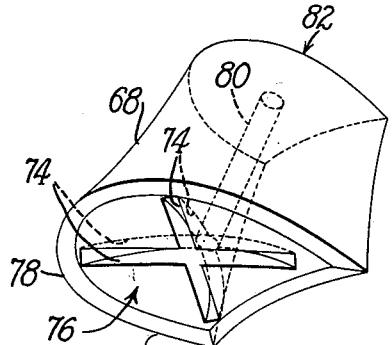
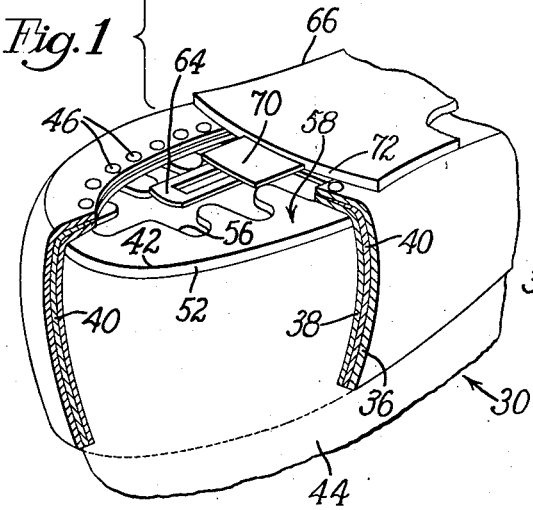
Inventors
Harold G. Shaw
James F. Leahy
John W. Ashley
By their Attorney Dec. 23, 1952 H. G. SHAW ET AL 2,622,347
SHOE AND ITS MANUFACTURE
Filed Sept. 7, 1950 4 Sheets-Sheet 2
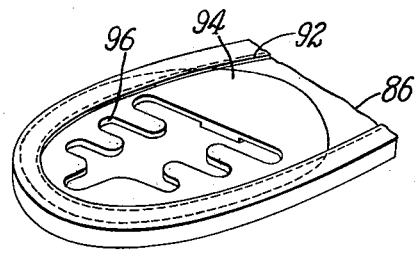
Fig. 8
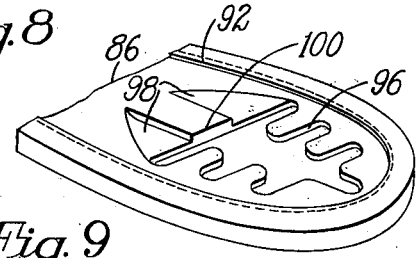
Fig. 9
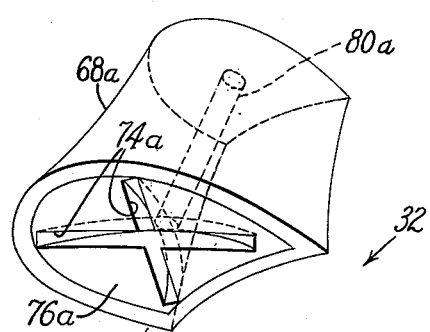
Fig. 7
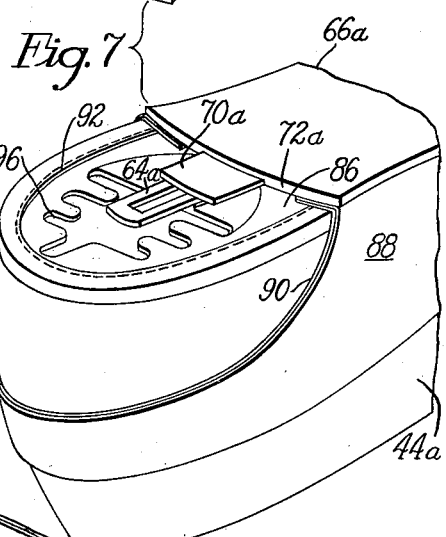
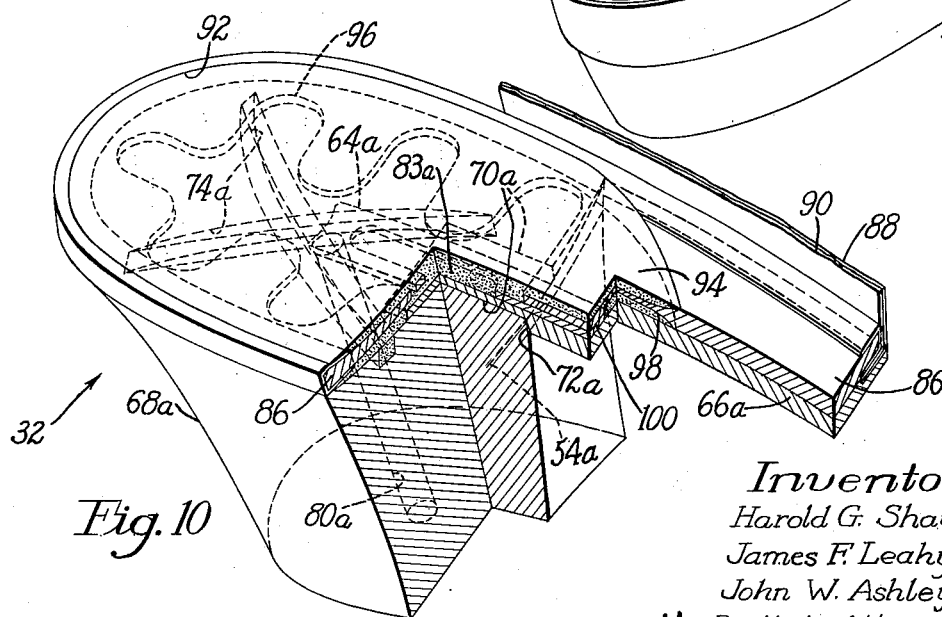
Fig. 10
Inventors
Harold G. Shaw
James F. Leahy
John W. Ashley
By their Attorney

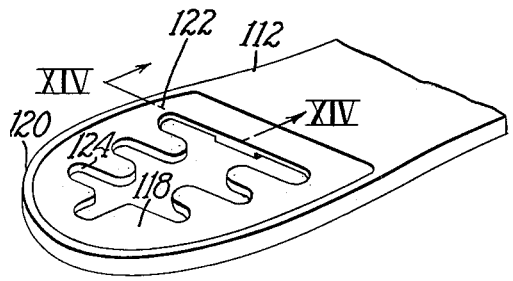
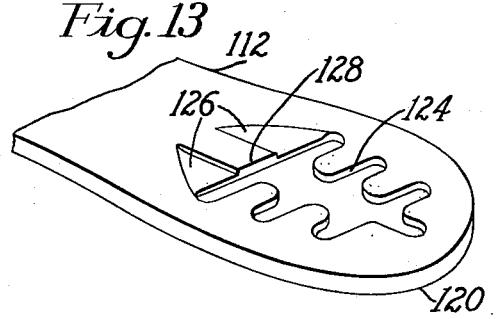
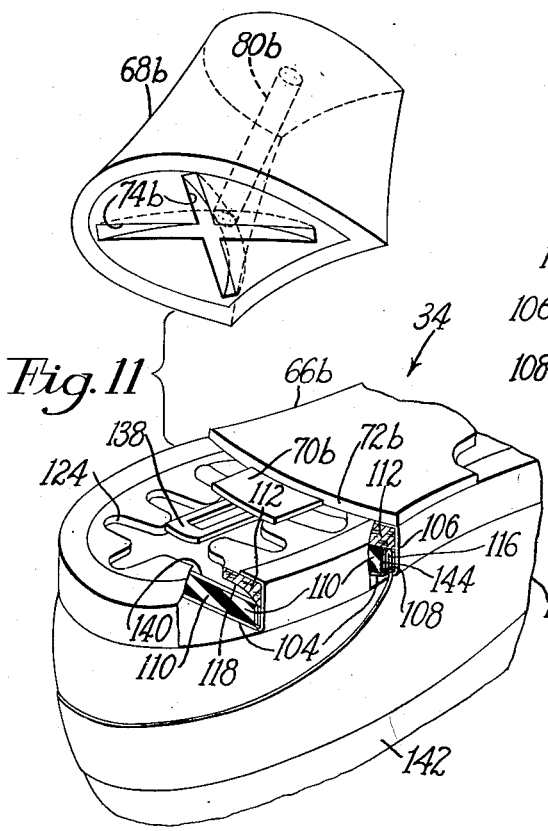
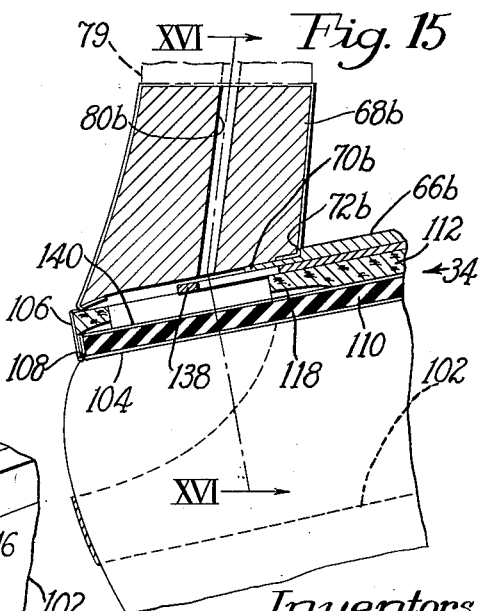

Dec. 23, 1952 H. G. SHAW ET AL 2,622,347
SHOE AND ITS MANUFACTURE
Filed Sept. 7, 1950 4 Sheets-Sheet 4

Inventors
Harold G. Shaw
James F. Leahy
John W. Ashley
By their Attorney

Patented Dec. 23, 1952

2,622,347

UNITED STATES PATENT OFFICE 2,622,347

SHOE AND ITS MANUFACTURE

Harold G. Shaw, James F. Leahy, and John W. Ashley, Beverly, Mass., assignors to United Shoe Machinery Corporation, Flemington, N. J., a corporation of New Jersey Application September 7, 1950, Serial No. 183,508

10 Claims. (Cl. 36—24.5)

This invention relates to shoemaking and is illustrated as embodied in improved shoes having heels which are attached by thermoplastic resin.

Open back shoes of the conventional type usually have their heels seated upon and nailed directly to their insoles and slip lasted shoes, which commonly have open backs, have their heels seated upon and nailed directly to their platforms. Leather or leather substitute insoles of conventional open back shoes are usually somewhat flimsy and do not effectively retain nails, and platforms of slip lasted shoes, which platforms are commonly made of granulated cork or leather substitutes and are usually thick, are commonly torn by heel attaching nails when there is any substantial strain on the heel of the shoe. Accordingly, it will be apparent that heels cannot be secured as effectively as desirable to shoes of the type referred to above. Moreover, as open back shoes are worn their heels because of the absence of the usual counter-portion of the shoe, commonly rock laterally with relation to their foreparts with the result that the shoes, due to such flexing, frequently break down in the vicinity of their heel breast lines.

It is an object of the present invention to provide comfortable, long wearing open back and slip lasted shoes which are free from the objections above noted.

With the above object in view and in accordance with a feature of the present invention there is provided a shoe having a resin fastening or rivet one end of which is anchored to an attached heel of the shoe and the other end of which overlies substantially the entire upper face of the heel seat portion of the insole of the shoe and serves rigidly to secure the heel to the heel seat portion of the shoe. The heels are quickly and effectively attached to shoes by said resin through the use of apparatus such as disclosed in United States Letters Patent No. 2,600,507, granted June 17, 1952, on an application filed in the names of James F. Leahy et al. In order to reinforce the rear portion of the shank of the shoe and to bind it rigidly to the heel, said upper end of the above-mentioned resin fastening or rivet, in accordance with another feature of the invention, extends over and under the rear shank portion of the insole of the shoe and serves rigidly to secure to the insole and to the heel a metallic shank stiffener, thereby reducing the above-mentioned tendency of the shoes to break down in the vicinity of their heel breast lines.

The present invention consists in the above features as well as other novel features hereinafter described, reference being had to the accompanying drawings which illustrate different embodiments of the invention selected for purposes of illustration, said invention being fully disclosed in the following description and claims.

In the drawings:

Fig. 1 is an exploded view showing in perspective the rear end of a conventional shoe mounted upon a last and a heel which is to be attached to the shoe;

Figs. 2 and 3 are perspective views showing the upper and lower faces respectively of the shank and heel seat portions of an insole of the shoe;

Fig. 4 is a section on line IV—IV of Fig. 2;

Fig. 5 is a longitudinal median section through the heel end of the shoe and the attached heel;

Figs. 6 is a section on line VI—VI of Fig. 5;

Fig. 7 is an exploded view similar to Fig. 1 but showing the rear end of an open back shoe and a heel which is to be attached to said shoe;

Figs. 8 and 9 are perspective views showing in detail the upper and lower faces respectively of an insole of the shoe shown in Fig. 7;

Fig. 10 is a perspective view, partly in section, of the heel end of an open back shoe after its heel has been attached;

Fig. 11 is an exploded view corresponding to the views of Figs. 1 and 7 but showing the rear end of a slip lasted shoe mounted upon a last and a heel which is to be attached to the shoe;

Figs. 12 and 13 are perspective views showing in detail the upper and lower faces respectively of the shank and heel seat portions of a granulated cork insole which is to be incorporated in the slip lasted shoe;

Fig. 15 is a longitudinal median section through the rear end of the slip lasted shoe and the heel forced against the heel seat of the shoe preparatory to attaching said heel to the shoe by thermoplastic resin;

Figure 14:
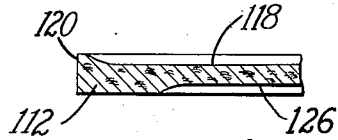
Fig. 14 is a section on line XIV—XIV of Fig. 12.
Figure 16:
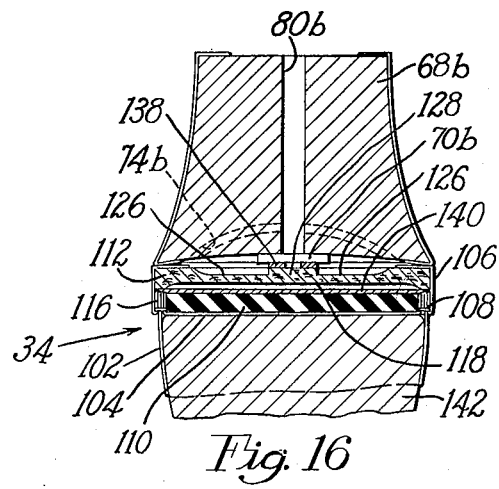
Fig. 16 is a transverse section on line XVI—XVI of Fig. 15.
Figure 17:
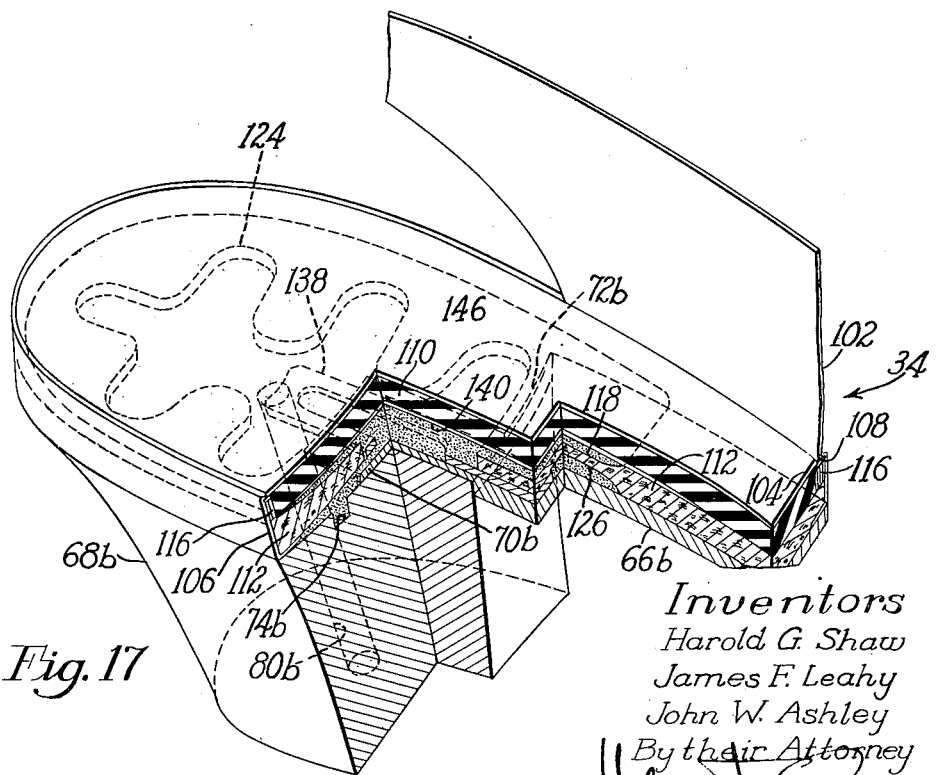
Fig. 17 is a perspective view, partly in section, of the heel and the slip lasted shoe after its heel has been attached.

The present invention is disclosed with reference to a conventional shoe 30 (Figs. 1, 5 and 6) as well as with reference to an open back shoe 32 (Figs. 7 and 10) and a slip lasted shoe 34 (Figs. 11, 15, 16 and 17). The shoe 30 has an upper 36 and a lining 38 which are sewed or otherwise secured together and between which is inserted and pasted a counter 40, the assembly being lasted over an insole or sole member 42 tacked to a last 44 and being permanently secured to said insole by lasting tacks 46. As best illustrated in Figs. 2 and 4 the insole 42 has formed in the upper face 48 of its heel seat portion a cavity 50 which extends approximately to the rim 52 of the heel seat portion of the insole and a substantial distance forward of a heel breast line 54 of the insole, the inner edge of said cavity terminating at a sinuous hole or opening 56 (Figs. 1, 2, and 3) extending thicknesswise through the heel seat portion of the insole. The bottom of the cavity 50 may be considered part of the upper face of the insole 42. Formed in the lower face 58 (Figs. 1, 3 and 4) of the insole 42 just forward of its heel breast line 54 are a pair of spaced recesses or cavities 60. Arranged between the cavities 60 is a rib 62 along which extends in the finished shoe a steel shank stiffener 64 which is usually tacked to the insole 42 prior to tacking the insole to the bottom of the last 44, the rear end of the shank stiffener being positioned, when the shoe is upright, just below the central portion of the hole 56. After the shoe has been lasted and an outsole 66 has been cemented or otherwise secured to the shoe the heel seat portion of the outsole is "fitted," that is, prepared for the reception of a wood heel 68 thus forming on the outsole a heel seat tab 70 and a heel breast receiving shoulder 72 (Fig. 1). The heel 68 and the method of injecting thermoplastic resin into the heel and the shoe are disclosed in detail in United States Letters Patent No. 2,607,061, granted August 19, 1952, on an application filed in the names of James F. Leahy et al., said heel comprising a pair of cross slots 74 (Figs. 1, 5 and 6) which are formed in the attaching face of the heel and have their general planes inclined at approximately 30° to the plane of the rim 78 (Fig. 1) of the attaching face of the heel. Since, as will be explained later, the thermoplastic resin fills the cross slots 74 said slots may be described as anchoring means or cavities. Viscous resin is injected into the cross slots 74 of the heel, while the heel is forced against the heel seat of the shoe, by heel clamping apparatus 79 (Figs. 5 and 6) fully disclosed in said Patent No. 2,600,507, through a passage 80 extending from the toplift receiving face 82 of the heel to the intersecting portions of the cross slots 74, the viscous resin being forced under initially high but decreasing pressure through the passage 80 to fill the cavities 50, 60 and the hole 56 in the insole, all voids existing between the heel seat portion of the shoe and the attaching face 76 of the heel, the cross slots 74 and usually all except the exit end of the passage 80, an injector or gun nozzle (not shown) by which the viscous resin is supplied, being withdrawn from the passage at the conclusion of the heel attaching operation. After the viscous resin has been injected into the various parts of the shoe and its heel, as above described, the heel is held under pressure against the heel seat of the shoe for a period sufficient to allow said viscous resin to harden, said resin serving as a lock, fastening, or rivet 83 which shrinks slightly, thus binding securely together the heel and the various other parts of the shoe. When the heel 68 has been attached to the shoe a hard mass of resin which forms said fastening overlies substantially the entire upper face 48 of the heel seat portion of the insole 42 and fills the cavities 50, 60, the holes 56, all voids existing between the heel seat portion of the shoe 30 and the heel 68, the cross slots 74 and the passage 80 in the heel. It will be noted that the resin in the forward portion of the cavity 50 and in the cavity 60 overlies the upper and lower faces respectively of the insole ahead or forward of the heel breast line 54, said resin also filling slight pockets existing at opposite sides of the shank stiffener between the insole and the outsole. In such a construction it will be apparent that the rear shank portion of the insole is rigidly secured to the heel and there is little likelihood of the shoe breaking down in the vicinity of its heel breast line as above explained. When parts of the conventional shoe 30, the open back shoe 32 and the slip lasted shoe 34 are referred to in the claims as being positioned "over" or "under" one another it is assumed that the shoes are positioned right side up upon a horizontal support.

The open back shoe 32 (Figs. 7 and 10) has its heel 68a secured directly to an insole or sole member 86 of the shoe, a skeleton upper 88 and lining 90 of the shoe being assembled and secured as a unit by various methods to the insole which usually has the margin of its heel seat portion bound by a cover strip 92. The absence in open back shoes 32 of a combined counter, upper and lining around the heel end of the shoe, renders the rear end of the open back shoe weak and since nails, which are driven through the heel seat portion of the insole, and glue are relied upon permanently to secure the heel to the shoe it will be apparent that the heel is likely to become loose and detached from the insole. Moreover, the rear shank portion of the insole of the shoe is likely to break down in the vicinity of its heel breast line because of the lateral tilting of the shoe while it is being worn. In the illustrative construction the insole 86 of the open back shoe 32 is provided at its upper face with a cavity 94 corresponding to the cavity 50 formed in the insole 42, and a hole 96 extending thicknesswise through the heel seat portion of the insole, said insole having in its lower face a pair of laterally spaced cavities 98 corresponding to the cavities 60 in the insole 42 and forming a ridge 100 to which a shank stiffener 64 is secured. The bottom of the cavity 94 may be described as forming part of the upper face of the insole 86. After tacking to the bottom of a last 44a the insole 86 to which the shank stiffener 64a has been tacked and lasting the combined upper 88 and lining 90 over the insole, an outsole 66a is cemented to the insole and its heel seat is fitted to produce a heel seat tab 70a and a heel breast receiving shoulder 72a. The heel 68a is then forced under heavy pressure against the heel seat portion of the insole 86 by the use of apparatus disclosed in the above-mentioned Patent No. 2,600,507 and viscous resin is forced through a passage 80a in the heel 68 and into the slots or anchoring cavities 74a in the attaching face 76a of the heel and into the hole 96 and the cavities 94, 98 in the insole, said resin being allowed to cool and harden while the heel is held forced against the insole with heel attaching pressure, thus forming a lock, fastening or rivet 83a one head of which constitutes the resin in the cavity 94 and the other head of which constitutes the resin anchored in the cross slots 74 and the passages 80a. The rivet 83a secures the heel 68a rigidly to the heel seat portion as well as to the shank portion of the insole thus effectively attaching the heel to the shoe and insuring against the breaking down of the shoe in the vicinity of its heel breast line 54a. The rear end portion of the insole constitutes and may be referred to as the heel seat portion of the shoe.

The illustrative slip lasted shoe 34 (Figs. 11, 15, 16 and 17) comprises a preassembled unit consisting of an upper 102, a sock lining 104 and a wrapper 106 which are secured together by one or more lines of stitches 108, a sponge rubber foot pad 110, a sole member or granulated cork insole 112 and an outsole 66b which is cemented to the lower face of the insole and to a margin of the wrapper 106 inturned upon and secured to the insole. A margin of the upper 102 is commonly folded back on itself before being sewed to the sock lining 104 and to the wrapper 106, the materials at a resultant seam 116 being in abutting relation to the edge of the rubber pad 110 and being approximately coextensive heightwise of the shoe with the pad.

The heel seat portion of the granulated cork insole 112 has formed in its upper face a cavity 118 which extends approximately to the rim 120 of the insole 112 and forward of a heel breast line 122 of the insole. Extending thicknesswise through the insole 112 at the central portion of the cavity 118 is a sinuous hole or opening 124 which has its forward edge extending along the heel breast line of the insole. The insole 112 has formed in its lower face just forward of the heel breast line 122 a pair of spaced cavities 126 separated by a ridge 128 along which extends a metallic shank stiffener 138 stapled or otherwise secured to the insole. In order to insure that the pressure of heel attaching resin shall be substantially uniform against the heel seat portion of the rubber pad 110 during the attachment of a heel 68b to the shoe 34 there is interposed between the pad 110 on the one hand and the heel seat and rear shank portion of the insole 112 on the other hand a rigid fibre tuck 140.

After the upper 102, the sock lining 104 and the platform wrapper 106 have been sewed together they are assembled upon a last 142 with the wrapper turned back along the sides of the last. The assembled pad 110, tuck 140, insole 112 and shank stiffener 138 are then positioned upon the sock lining 104, which rests upon the bottom of the last 142, with the edge of the pad offset inward from the last and the edge of the insole in general alinement with the sides of the last. The sock lining 104 may be described as overlying the upper face of the pad 110. After applying cement to the inside face of the wrapper 106 and/or to the margin of the bottom face of the insole 112 the wrapper is folded around the edge of the insole and is lasted over the margin of the bottom of the insole, the folded over seam materials 116 of the sock lining upper and wrapper assembly fitting in a rabbet formed by the assembled insole and pad 110. An outsole 66b is then secured to the bottom of the composition cork insole and to the overlasted margin of the wrapper 106 upon said insole after which the heel seat portion of the outsole is fitted to provide a heel seat tab 70b and a heel breast receiving shoulder 72b.

The insole 112 and the pad 110 constitute and may be described as a platform. It will be understood that the pad 110 may be omitted in which event the insole constitutes the platform.

The heel 68b which is identical with the heel 68 is then positioned upon the cork insole 112 with its breast in engagement with the heel breast receiving shoulder 72b and is clamped against said insole by the use of apparatus such as disclosed in said Patent No. 2,600,507. Viscous resin is then forced through a passage 80b in the heel by the use of the above-mentioned injector or gun thus filling the hole 124 and the cavities 118, 126 in the insole 112 as well as filling all voids existing between the attaching face of the heel and the insole and also cross slots or anchoring cavities 74b and the passage 80b of the heel. After the resin has hardened and shrunk a resultant resin lock, fastening or rivet 146 (Fig. 17) which overlies the upper face of the heel seat and the rear shank portion of the insole 112 and is anchored in the slots 74b of the heel 68b forces the rim of the attaching face of the heel firmly against the heel seat portion of the insole and serves permanently to attach the heel to the shoe. The resin forced into and filling the cavities 118, 126 in the cork insole 112 rigidly binds together the heel 68b, the shank stiffener 138 and the rear portion of the shank of the insole 112 thereby strengthening the shoe in the vicinity of its heel breast line 122 and insuring against said shoe breaking down in the vicinity of its rear shank portion.

Having thus described our invention, what we claim as new and desire to secure by Letters Patent of the United States is:

1. A shoe comprising a heel having anchoring means and a sole member a heel seat portion of which has a hole extending through it, said sole member having formed in the upper face of its heel seat portion a cavity which extends inwardly to the hole and outwardly approximately to the rim of the heel seat portion of the sole member, said anchoring means, hole and cavity as well as any voids existing between the heel seat portion of the sole member and the heel being filled with a mass of resin which is of sufficient strength permanently to secure the heel to the shoe.

2. In an open back shoe, a heel, an insole in engagement with the rim of the attaching face of the heel, said heel having in its attaching face an anchoring slot and said insole having a hole extending through its heel seat portion and having in its upper face a cavity extending from points adjacent to the rim of said heel seat portion to said hole, a single mass of resin filling said anchoring slot and said cavity as well as substantially filling all voids existing between the attaching face of the heel and the insole, said mass of resin serving as a fastening for permanently securing the heel to the shoe.

3. A shoe having a heel provided with an anchoring slot and having a sole member a heel seat portion of which has a hole extending thicknesswise through it, said sole member having in the margin of the upper face of its heel seat portion a cavity which communicates with said hole and which extends approximately to the rim of the heel seat portion of the sole member and a substantial distance forwardly of a heel breast line of the sole member, said sole member having formed in its lower face and in communication with the hole one or more cavities which extend over a substantial width of the sole member and forwardly of the heel breast line of the sole member, and a mass of resin which fills the anchoring cavity, the hole, the cavities in the sole member, and any voids existing between the heel and the sole member, said resin serving as a rivet for securely attaching the heel to the shoe.

4. A shoe having a heel provided with an anchoring slot and having a sole member a heel seat portion of which has a hole extending thicknesswise through it, said sole member having in the margin of the upper face of its heel seat portion a cavity which communicates with said hole and which extends approximately to the rim of the heel seat portion of the sole member and a substantial distance forwardly of a heel breast line of the sole member, said sole member having formed in its lower face and in communication with the hole one or more cavities which extend over a substantial width of the sole member and forwardly of the heel breast line of the sole member, a shank stiffener which is attached to and underlies the sole member and extends along said hole in the sole member and along the cavities formed in the lower face of the sole member, and a mass of resin which fills the anchoring slot in the heel, the hole, the cavities in the sole member and any voids existing between the heel and the sole member and in which the rear end of the shank stiffener is embedded, said resin serving as a fastening for securely attaching the heel to the shoe.

5. In a slip lasted shoe, a heel having in its attaching face an anchoring cavity, a preassembled unit comprising an upper, a sock lining and a wrapper, a platform comprising a sole member and a resilient pad the margins of which are secured together by the wrapper, said sole member having a hole extending thicknesswise through its heel seat portion and having in the upper face of its heel seat portion a cavity extending from said hole approximately to the periphery of said heel seat portion, and a mass of hardened thermoplastic resin which fills the anchoring cavity in the heel and fills the hole and the cavity in the sole member as well as any voids existing between the sole member and the heel, said resin serving permanently to secure the heel to the shoe.

6. In a slip lasted shoe, a heel having an anchoring cavity, a unit comprising an upper, a sock lining and a wrapper, a platform which has an anchoring cavity, said sock lining overlying the upper face of the platform and the wrapper being bound around and secured to the margin of the platform, and a mass of hardened thermoplastic resin which fills the anchoring cavities in the heel and platform and serves permanently to secure the heel to the platform.

7. In a slip lasted shoe, a heel having an anchoring cavity, a unit comprising an upper, a sock lining and a wrapper, a platform comprising a resilient pad and a sole member which has an anchoring cavity, said sock lining overlying the upper face of said pad and the wrapper being bound around the combined margins of the pad and the sole member and being secured to the sole member, and a mass of hardened thermoplastic resin which fills the anchoring cavities in the heel and the sole member and serves permanently to secure the heel to the sole member.

8. In a slip lasted shoe, a heel having an anchoring cavity, a unit comprising an upper, sock lining and a wrapper, a platform comprising a foot pad and a sole member which has an anchoring cavity, said sock lining overlying the upper face of the pad and the wrapper being bound around the combined margins of the pad and the sole member and being secured to the sole member, a rigid tuck interposed between the pad and the anchoring cavity of the sole member, and a mass of hardened thermoplastic resin which fills the anchoring cavity in the heel of the sole member and serves permanently to secure the heel to the sole member.

9. In a slip lasted shoe, a heel having an anchoring cavity, a unit comprising an upper, a sock lining and a wrapper, a platform comprising a foot pad and a sole member, said sole member having in its heel seat portion a hole extending through the sole member and having in the upper face of its heel seat portion and its rear shank portion a cavity extending from approximately the marginal rim of the sole member to said hole, said sole member having in its lower shank face one or more cavities in communication with said hole, and a mass of hardened thermoplastic resin which fills the anchoring cavity in the heel and fills the hole and also the cavities in the upper and lower faces of the sole member thus serving permanently and rigidly to secure the heel to the platform.

10. In a slip lasted shoe, a heel having an anchoring cavity, an upper, a sock lining and a wrapper which are sewed together, a platform comprising a resilient foot pad and a sole member, said sole member having a hole extending thicknesswise through its heel seat portion and having in the upper face of said heel seat portion and in its rear shank portion a cavity extending from approximately the marginal rim of the sole member to said hole, said sole member having at the rear end of its lower shank face a pair of cavities which are in communication with said hole, a shank stiffener which is secured to the lower face of the shank portion of the sole member and which is arranged between the cavities of said pair of cavities and which extends into a void formed between the attaching face of the heel and the hole in the sole member, an outsole which is secured to the sole member and is fitted for the reception of the heel, and a mass of hardened thermoplastic resin which fills said voids, the anchoring cavity in the heel and which fills the hole and the cavities in the upper and lower faces of the sole member, said resin serving permanently to secure together the heel and the sole member.

HAROLD G. SHAW.
JAMES F. LEAHY.
JOHN W. ASHLEY.

REFERENCES CITED

The following references are of record in the file of this patent:

UNITED STATES PATENTS

| Number | Name | Date |
|---|---|---|
| 2,287,445 | Palumbo | June 23, 1942 |
| 2,291,711 | Hagerty | Aug. 4, 1942 |
| 2,299,197 | Ushakoff | Oct. 20, 1942 |
| 2,312,872 | Browne | Mar. 2, 1943 |